Jan. 26, 1943.　　　G. TRAUTVETTER　　　2,309,362
HOPPER CONDUIT FOR RAIL CARS
Filed Sept. 19, 1941
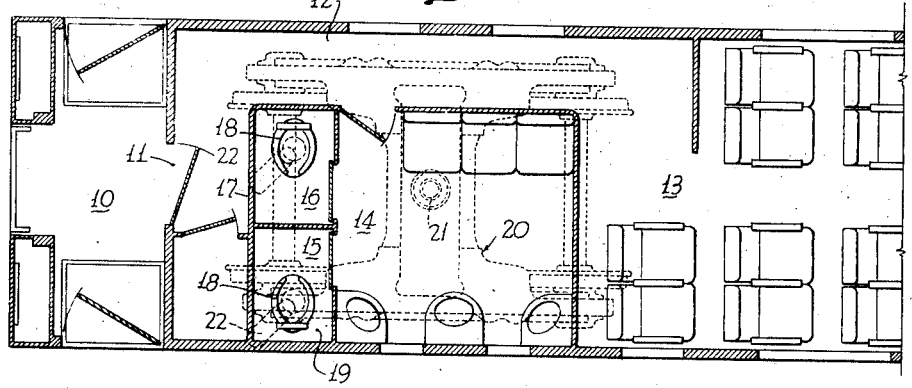
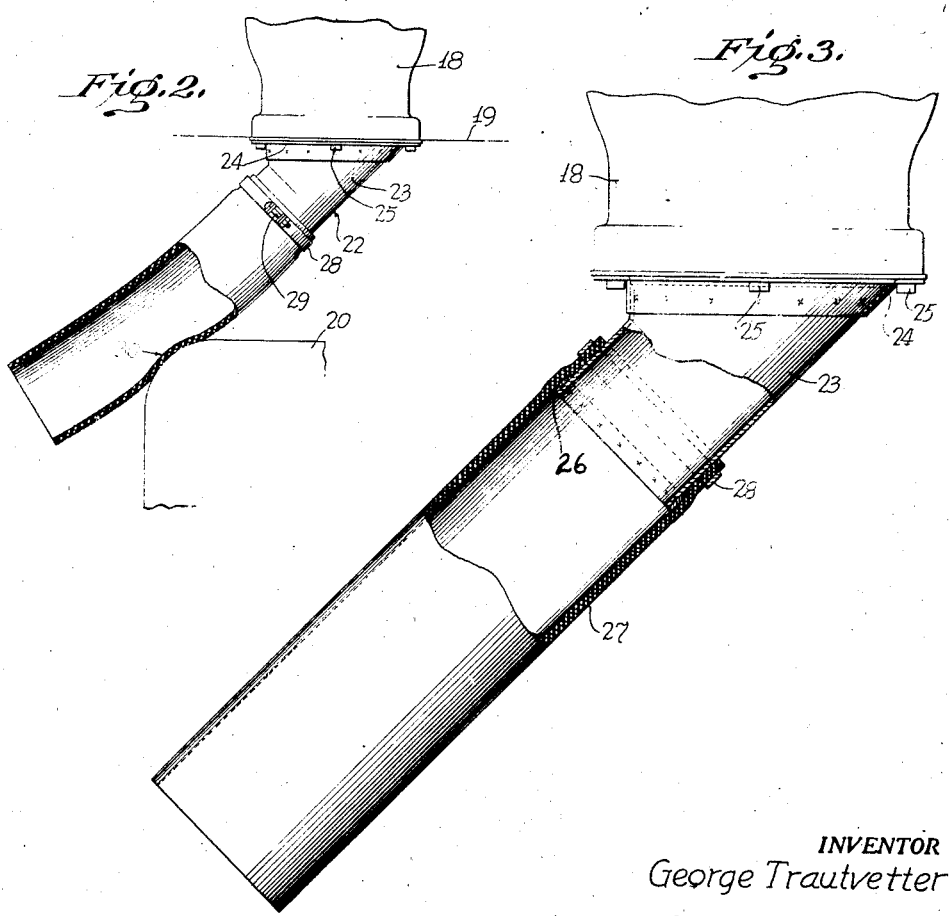
INVENTOR
George Trautvetter
BY John P. Parker
ATTORNEY Patented Jan. 26, 1943

2,309,362

UNITED STATES PATENT OFFICE 2,309,362

HOPPER CONDUIT FOR RAIL CARS

George Trautvetter, Philadelphia, Pa., assignor to Edward G. Budd Manufacturing Company, Philadelphia, Pa., a corporation of Pennsylvania Application September 19, 1941, Serial No. 411,457

5 Claims. (Cl. 105—329)

The invention relates to rail cars and particularly to that class of rail cars provided with a hopper or hoppers located in the area thereof vertically over the usual swivelled truck supporting an end of the car.

With a hopper so arranged, the discharge therefrom through the usual short, rigid discharge conduit was likely to defile the truck frame or parts mounted thereon or if such rigid conduit was extended downwardly and directed so as to avoid the discharge from the hopper from fouling the truck, it was exposed to the danger of bending or breaking, on short radius tracks, by having parts of the truck strike such downwardly extended conduit. Thus, the rigid conduit extended close to the trackway to avoid splashing and scattering of the discharge over the truck was objectionable because liable to damage or destruction on short radius tracks.

It is an object of the invention to overcome these difficulties and to provide a conduit for conducting the discharge from the hopper to the trackway which is free of the objectionable features above pointed out and which is simple in construction and readily applied and has the merit of long service before it needs replacement and of ready replacement if required.

To this end, the conduit of my invention is made of composite construction, having an upper short metal tubular portion into which the hopper directly discharges and a lower extension thereof which is flexible and resilient so that it can readily be deformed if hit by a portion of the truck in its swivelling movement. By extending this lower flexible portion down below the top of the truck, the discharge can be delivered close to the trackway, doing away with defiling of the truck and parts carried thereby and avoiding excessive scattering of the discharge when it strikes the trackway. The flexibility and resilience of the material of the lower extension at the same time, prevents damage thereof by the truck since the swivelling truck can readily push it aside or indent its walls, after which it will return to its normal open position.

In a preferred form the upper rigid portion of the conduit may be made of sheet metal bolted in water-tight fashion to the discharge opening of the hopper while the lower flexible portion may be of a rubber suitably reinforced by fabric vulcanized thereto and readily detachably secured by a simple clamping means to the end of the upper rigid portion. Other and further objects and advantages and the manner in which they are attained will become clear from the following detailed description when read in connection with the drawing forming a part hereof.

In the drawing:

Fig. 1 is a diagrammatic plan view of one end of a rail car to which the invention is shown applied, parts under the car floor being shown in dotted lines.

Fig. 2 is an enlarged detail view, part being in section, showing the manner in which conduit may be bent aside or its wall deflected by engagement with a portion of truck, shown diagrammatically.

Fig. 3 is a still further enlarged view of the conduit, parts being shown in section to show the manner of attachment of the flexible portion to the rigid portion.

The invention is shown applied to a sleeper coach car having an entrance vestibule 10, a doorway 11 leading from the vestibule to the side aisle 12 which leads in turn to the passenger seating space 13. Between the inner side aisle wall and the opposite side wall of the car is located a wash room 14 which includes a pair of separate toilet annexes 15 and 16 adjacent to each other and extending along the outer transverse wall 17 of the wash room. Each of the toilet annexes is provided with a hopper 18 secured in a usual manner to the floor 19 of the car and having its discharge opening located over a hole in the floor.

From Fig. 1 it is clear that the truck 20 including the truck frame and the wheels and axles supporting it is located under the area occupied by the toilet annexes so that if no conduit were provided for the hoppers, the discharge therefrom would strike and defile the truck. The truck 20, of course, supports the end of the car body in the usual manner through the center plate bearing indicated at 21 which allows swivelling of the truck with respect to the car body in going around curved tracks.

Each of the hoppers 18 is provided with a discharge conduit designated generally by 22, this conduit including an upper sheet metal tube 23 having a flange 24 bolted as at 25, directly to the base of the hopper 18 in alignment with its discharge opening. In the form shown this tube or conduit is shown inclined to direct the discharge from the hopper laterally away from the parts of the truck directly below the hopper.

The short metallic portion 23 has its lower margin stiffened, strengthened and shouldered as by a narrow metal strip 26 encircling the tube and secured thereto as by spot welding as shown. This short metallic portion terminates vertically a distance above the top face of the truck 20, as diagrammatically illustrated in Fig. 2, and is extended downwardly well below the top of the truck to a position near the trackway by the flexible and resilient portion 27. This latter may be, as shown, in direct extension of the inclined lower end of the rigid tubular portion 23, and is readily secured thereto by having its upper end telescoped some distance over the lower end of tube 23 and clamped thereto by a clamping ring 28 having its ends drawn together by a bolt and nut 29. The clamping ring being located above the shouldered lower margin of the metallic portion 23 makes additionally positive the securement of the parts.

The flexible and resilient portion 27 is preferably made of rubber reinforced by fabric so that it normally retains its tubular shape, but is readily pushed aside or deformed as shown at 30 (Fig. 2), if the truck 20 swings sufficiently to strike its wall. After such deformation it returns to normal as shown in Fig. 3.

It will be understood that the inclination of the conduit does not detract materially from its self-cleaning since the underside of the chute inclines uniformly from the discharge opening in the bottom of the hopper and this inclination may be varied within wide limits from straight vertical arrangement to the inclination shown or even greater inclination, all without departing from the invention.

What is claimed is:

1. In a rail car having a hopper seated on the floor thereof in a region over a swivelled truck supporting said car, a composite conduit for said hopper extending its discharge opening downwardly below the top of the truck, the upper portion of said conduit being rigid and connected to the hopper, and terminating short of the top of the truck, and the lower portion projecting freely below the top of the truck but normally free of engagement therewith and being flexible and resilient, whereby it may be distorted by engagement with the truck in the swivelling movement of the latter and returned to its normal condition when freed of the truck engagement.

2. In a rail car having its end supported by a swivelled truck, a hopper seated on the floor of the car over a portion of the truck, a conduit leading from the discharge opening of the hopper and terminating in a free end at a point below the top of the truck and normally free of engagement therewith, the portion of said conduit so extending below the top of the truck being flexible and resilient to permit distortion thereof and prevent damage thereto should it be engaged by the truck in its swivelling movement and to automatically return it to normal position when released from truck engagement.

3. In combination, a rail car supported adjacent its end by a wheeled truck having swivelled connection therewith and with top portions of the truck apart from its swivelled connection spaced some distance from the floor of the car body, a hopper seated on the floor of said car over said truck, and a conduit connected to the discharge opening of said hopper and having at least a portion of the free end thereof extended downwardly below said top portions of the truck but normally free of engagement therewith, said downwardly extended portions being flexible, to permit distortion thereof when engaged by a portion of the truck in its swivelling movement with respect to the car body, but having sufficient resilience to return to its original form when freed of the distorting force.

4. In a rail car having a hopper seated on the floor thereof in a region over a swivelled truck supporting the car, a composite conduit for said hopper extending its discharge opening downwardly with its free end below the top of the truck but normally free of engagement therewith, the upper portion of said conduit being a rigid metallic tube flanged in its upper margin and secured to the base of the hopper and the lower portion being a flexible resilient tube telescoping the lower portion of metallic tube and means for clamping the telescoping portions together, the flexible resilient portion permitting distortion thereof when engaged by a portion of the truck in the swivelling movement of the latter, but having sufficient resilience to return it to its original form when freed of the distorting force.

5. In a rail car, a car body, a swivelled truck supporting said body, and a hopper seated on the floor of said body in a region over said truck; a discharge conduit having its upper end connected to the discharge opening of said hopper and being downwardly extended below the top of said truck; said conduit extending across the path taken by a portion of said truck during swivelling movement of the latter with respect to said car body; at least a portion of said conduit being flexible to permit temporary distortion of the conduit when it is forced out of its normal position by the movement of said portion of the truck but having sufficient resilience to return to its normal form when freed from the distorting force.

GEORGE TRAUTVETTER.